US006777103B2

(12) United States Patent
Merkley et al.

(10) Patent No.: US 6,777,103 B2
(45) Date of Patent: Aug. 17, 2004

(54) FIBER CEMENT COMPOSITE MATERIAL USING BIOCIDE TREATED DURABLE CELLULOSE FIBERS

(75) Inventors: Donald J. Merkley, Alta Loma, CA (US); Caidian Luo, Alta Loma, CA (US)

(73) Assignee: James Hardie Research Pty Limited (AU)

( * ) Notice: Subject to any disclaimer, the term of this patent is extended or adjusted under 35 U.S.C. 154(b) by 104 days.

(21) Appl. No.: 09/969,964

(22) Filed: Oct. 2, 2001

(65) Prior Publication Data

US 2002/0069791 A1 Jun. 13, 2002

Related U.S. Application Data

(60) Provisional application No. 60/241,212, filed on Oct. 17, 2000.

(51) Int. Cl.[7] .............................................. B32B 23/04
(52) U.S. Cl. ................. 428/532; 428/537.1; 428/537.5; 428/689; 428/907; 428/401; 428/372; 428/364; 428/332; 428/326; 162/10; 162/13; 162/24; 162/72; 162/74; 162/76; 162/79; 162/80; 162/82; 162/87; 162/90; 162/141; 162/146; 162/145; 162/154; 162/155; 162/157.1; 162/157.2; 162/157.6; 162/160; 162/161; 162/163; 162/164.1; 162/175; 162/180; 162/181.1; 162/181.2; 162/182; 162/183; 162/218; 162/231
(58) Field of Search ................................ 428/332, 364, 428/372, 401, 411.1, 532, 537.1, 537.5, 688, 689, 907, 323, 326; 162/24, 10, 13, 70, 72, 74, 76, 79, 80, 82, 87, 90, 91, 100, 141, 142, 145, 146, 153, 154, 155, 157.1, 157.2, 157.6, 158, 159, 160, 161, 163, 164.1, 175, 180.1, 181.2, 182, 183, 218, 231

(56) References Cited

U.S. PATENT DOCUMENTS

| | | | |
|---|---|---|---|
| 1,571,048 | A | 1/1928 | Garrow |
| 2,176,668 | A | 10/1939 | Housfoin |
| 2,377,484 | A | 6/1945 | Elmendorf |
| 3,284,125 | A | 8/1966 | Bourfin |
| 3,748,100 | A | 7/1973 | Corbojoi |
| 3,755,749 | A | 8/1973 | Nutt |
| 3,969,567 | A | 7/1976 | Occleshaw et al. |
| 4,098,701 | A | 7/1978 | Burrill et at. |

(List continued on next page.)

FOREIGN PATENT DOCUMENTS

| | | |
|---|---|---|
| AU | 515161 | 3/1981 |
| EP | 484283 | 8/1992 |
| FR | 2611432 | 9/1988 |
| GB | 1604910 | 5/1978 |
| GB | 2307425 | 5/1997 |
| WO | WO 91/01409 | 2/1991 |
| WO | WO 01/81666 A2 | 11/2001 |

Primary Examiner—Deborah Jones
Assistant Examiner—Wendy Boss
(74) Attorney, Agent, or Firm—Knobbe Martens Olson & Bear LLP

(57) ABSTRACT

A fiber cement composite material providing improved rot resistance and durability, the composite material incorporating biocide treated fibrous pulps to resist microorganism attacks. The biocide treated fibers have biocides attached to inner and outer surfaces of individualized fibers to protect the fibers from fungi, bacteria, mold and algae attacks. The biocides selected have strong affinity to cellulose and do not interfere with cement hydration reactions. This invention also discloses the formulation, the method of manufacturing and the final fiber cement products using the biocide treated fibers.

67 Claims, 2 Drawing Sheets

(1 of 2 Drawing Sheet(s) Filed in Color)

U.S. PATENT DOCUMENTS

| Patent No. | Date | Inventor |
|---|---|---|
| 4,177,176 A | 12/1979 | Burrill et al. |
| 4,258,090 A | 3/1981 | Moraru |
| 4,406,703 A | 9/1983 | Guthrie et al. |
| 4,497,688 A | 2/1985 | Schaefer |
| 4,510,020 A | 4/1985 | Green et al. |
| 4,637,860 A | 1/1987 | Harper et al. |
| 4,847,505 A | 3/1987 | Blackie et al. |
| 4,847,689 A | 3/1987 | Volone |
| 4,944,842 A | 7/1990 | Stromberg et al. |
| 4,971,658 A | 11/1990 | Henricson et al. |
| 4,985,119 A | 1/1991 | Vinson et al. |
| 5,021,093 A | 6/1991 | Beshay |
| 5,030,289 A | 7/1991 | Sattler et al. |
| 5,047,066 A | 9/1991 | Hayakawa et al. |
| 5,063,280 A | 11/1991 | Chen et al. |
| 5,102,598 A | 4/1992 | Lempfer et al. |
| 5,118,225 A | 6/1992 | Koch et al. |
| 5,191,458 A | 3/1993 | Sutherland et al. |
| 5,223,090 A | 6/1993 | Klungness et al. |
| 5,405,498 A | 4/1995 | Pease |
| 5,416,781 A | 5/1995 | Backlund et al. |
| 5,465,547 A | 11/1995 | Jakel |
| 5,520,779 A | 5/1996 | Bold |
| 35,480 | 2/1997 | Klungness et al. |
| 5,643,359 A | 7/1997 | Soroushian et al. |
| 5,795,515 A | 8/1998 | Fischer |
| 5,804,003 A | 9/1998 | Nishizawa |
| 5,876,561 A | 3/1999 | Tsai |
| 5,897,701 A | 4/1999 | Soroushian et al. |
| 5,989,336 A | 4/1999 | Soroushian et al. |
| 6,030,447 A | 2/2000 | Naji et al. |
| 6,045,057 A | 4/2000 | Moor et al. |
| 6,086,998 A * | 7/2000 | Wihsmann et al. |
| 6,138,430 A | 10/2000 | Van Acoleyen et al. |
| 6,228,215 B1 | 5/2001 | Hoffman, Jr. |
| 2002/0007926 A1 * | 1/2002 | Jewell et al. |
| 2002/0051892 A1 * | 5/2002 | Laks et al. |

\* cited by examiner

FIBER CEMENT COMPOSITE MATERIAL USING BIOCIDE TREATED DURABLE CELLULOSE FIBERS

RELATED APPLICATIONS

This application claims the benefit of U.S. Provisional Application No. 60/241,212, filed on Oct. 17, 2000, which is hereby incorporated by reference in its entirety.

BACKGROUND OF THE INVENTION

1. Field of the Invention

This invention relates to cellulose fiber reinforced cement composite materials using biocide treated cellulose fibers, including fiber treatment methods, formulations, methods of manufacture and final products with improved material properties relating to the same.

2. Description of the Related Art

Ordinary Portland cement is the basis for many products used in building and construction, primarily concrete and steel reinforced concrete. Cement has the enormous advantage that it is a hydraulically settable binder, and after setting it is little affected by water, compared to gypsum, wood, wood particle boards, fiberboard, and other common materials used in building products. The high pH of cement usually provides cement products good resistances to the damages by biological attacks.

Asbestos Fiber Cement Technology

About 120 years ago, Ludwig Hatschek made the first asbestos reinforced cement products, using a paper-making sieve cylinder machine on which a very dilute slurry of asbestos fibers (up to about 10% by weight of solids) and ordinary Portland cement (about 90% or more) was dewatered, in films of about 0.3 mm, which were then wound up to a desired thickness (typically 6 mm) on a roll, and the resultant cylindrical sheet was cut and flattened to form a flat laminated sheet, which was cut into rectangular pieces of the desired size. These products were then air-cured in the normal cement curing method for about 28 days. The original use was as an artificial roofing slate.

For over 100 years, this form of fiber cement found extensive use, for roofing products, pipe products, and walling products, both external siding (planks and panels), and wet-area lining boards. Asbestos cement composite was also used in many applications requiring high fire resistance due to the great thermal stability of asbestos. The great advantage of all these products was that: they were relatively lightweight; water affected them relatively little, and they had a good resistance to biological damages, since the high-density asbestos/cement composite is of low porosity and permeability. Asbestos fiber cement composites also have pretty good biological resistance. The disadvantage of these products was that the high-density matrix did not allow nailing, and methods of fixing involved pre-drilled holes.

Although the original Hatschek process (a modified sieve cylinder paper making machine) dominated the bulk of asbestos cement products made, other processes were also used to make specialty products, such as thick sheets (for example, greater than 10 mm which required about 30 films). These used the same mixture of asbestos fibers and cement. Sometimes some process aid additives are applied in the processes such as extrusion, injection molding, and filter press or flow-on machines.

Two developments occurred around the middle of the last century that are of high significance to modern replacements of asbestos based cement composites. The first was that some manufacturers realized that the curing cycle could be considerably reduced, and cost could be lowered, by autoclaving the products. This allowed the replacement of much of the cement with fine ground silica, which reacted at autoclave temperatures with the excess lime in the cement to produce calcium silica hydrates similar to the normal cement matrix. Since silica, even when ground, is much cheaper than cement, and since the autoclave curing time is much less than the air cured curing time, this became a common, but by no means universal manufacturing method. A typical formulation would be 5–10% asbestos fibers, 30–50% cement, and 40–60% silica.

The second development was to replace some of the asbestos reinforcing fibers by cellulose fibers from wood or other raw materials. This was not widely adopted except for siding products and wet-area lining sheets. The great advantage of this development was that cellulose fibers are hollow and soft, and the resultant products could be nailed rather than by fixing through pre-drilled holes. The siding and lining products are used on vertical walls, which is a far less demanding environment than roofing. However, cellulose reinforced cement products are more susceptible to water induced damages and biological attacks, compared to asbestos cement composite materials. A typical formulation would be 3–4% cellulose, 4–6% asbestos, and either about 90% cement for air-cured products, or 30–50% cement, and 40–60% silica for autoclaved products.

Asbestos fibers had several advantages. The sieve cylinder machines require fibers that form a network to catch the solid cement (or silica) particles, which are much too small to catch on the sieve itself. Asbestos, although it is an inorganic fiber, can be "refined" into many small tendrils running off a main fiber. Asbestos fibers are strong, stiff, and bond very strongly with the cement matrix. They are stable at high temperatures. They are stable against alkali attack under autoclave conditions. Asbestos fibers are also biologically durable. Hence, asbestos reinforced fiber cement products are themselves strong, stiff (also brittle), and could be used in many hostile environments, except highly acidic environments where the cement itself is rapidly attacked chemically.

Alternative Fiber Cement Technologies

In the early 1980's, the health hazards associated with mining, or being exposed to and inhaling, asbestos fibers started to become a major health concern. Manufacturers of asbestos cement products in the USA, some of Western Europe, and Australia/New Zealand in particular, sought to find a substitute for asbestos fibers for the reinforcement of building and construction products, made on their installed manufacturing base, primarily Hatschek machines. Over a period of twenty years, two viable alternative technologies have emerged, although neither of these has been successful in the fall range of asbestos applications.

In Western Europe, the most successful replacement for asbestos has been a combination of PVA fibers (about 2%) and cellulose fibers (about 5%) with primarily cement, about 80%. Sometimes the formulation contains 10–30% inert fillers such as silica or limestone. This product is air-cured, since PVA fibers are, in general, not autoclave stable. It is generally made on a Hatschek machine, followed by a pressing step using a hydraulic press. This compresses the cellulose fibers, and reduces the porosity of the matrix. Since PVA fibers can't be refined while cellulose can be, in this Western European technology the cellulose fiber functions as a process aid to form the network on the sieve that catches the solid particles in the dewatering step. This product has reasonably good biological durability due to its high density and non-biological degradable PVA fiber. The major application is for roofing (slates and corrugates). It is usually (but not always) covered with thick organic coatings. The great disadvantage of these products is a very large increase in material and manufacturing process costs. While cellulose is currently a little more than asbestos of $500 a ton, PVA is about $4000 a ton. Thick organic coatings are also expensive, and the hydraulic pressing is a high cost manufacture step.

In Australia/New Zealand and the USA, the most successful replacement for asbestos has been unbleached cellulose fibers, with about 35% cement, and about 55% fine ground silica, such as described in Australian Patent No. 515151 and U.S. Pat. No. 6,030,447, the entirety of which is hereby incorporated by reference. This product is autoclave cured, as cellulose is fairly stable in autoclaving. It is generally made on a Hatschek machine, and it is not usually pressed. The products are generally for siding (panels and planks), and vertical or horizontal tile backer wet area linings, and as eaves and soffits in-fill panels. The great advantage of these products is that they are very workable, even compared to the asbestos based products, and they are low cost.

However, cellulose fiber cement materials can have performance drawbacks such as lower rot resistance and poorer long-term durability compared to asbestos cement composite materials. These drawbacks are due in part to the inherent properties of natural cellulose fibers. Cellulose fibers are comprised of primarily polysaccharides (cellulose and hemicellulose) and are highly hydrophilic and porous, which in combination make them an attractive source of nutrients for many microorganisms. As such, cellulose fibers are susceptible to bio-decay or rot attack when incorporated into fiber reinforced cement composite materials, which also happen to be highly porous. Particularly in high humidity environments, the pore spaces in the fiber reinforced cement material facilitate water transportation to the fibers and thus provide access to microorganisms such as fungi, bacteria, algae, and molds. Microorganisms can be carried by water through the pores of the cellulose fibers. The organisms can grow on the surface and/or inside the composite material by utilizing cellulose and hemicellulose as nutrients. The microorganisms will break down cellulose polymer chains, resulting in significant loss in the fiber strengths. The cleavages of cellulose fiber chains by the microorganisms eventually reduce the reinforcement efficiency of the fibers and adversely affect the long-term durability of fiber cement materials.

To summarize, the replacement of asbestos in Europe has been largely by air cured fiber cement products, using PVA fibers, and pressed after forming in the green state. The primary problem with this technology is increased material and manufacturing cost. The replacement of asbestos in USA and Australia/New Zealand has been largely by autoclaved fiber cement products, using cellulose fibers, and formed with lower density without pressing. However, the problems associated with this technology include higher porosity of the product and higher susceptibility to biological attacks when compared to asbestos fiber cement materials.

Accordingly, there is a need for a cost effective, fiber cement composite material that has improved rot resistance. There is also a need for an individualized reinforcing fiber that retains the advantages of cellulose and yet is more durable than regular cellulose fibers. To this end, there is a particular need for a more cost effective and durable fiber reinforced cementitious material that is resistant to microorganism attacks even in high humidity environments.

Applicant is aware of only one prior art reference that discloses applying a biocide agent to a cellulose fiber for application in calcium carbonate products (see U.S. Pat. No. 6,086,998). This patent is directed to making nonflammable cellulose fiber with addition of a small amount of "surface-active" biocide agents to the outer surfaces of the cellulose fibers. The '998 patent is not specifically directed to the use of the fibers for fiber reinforced cement composite materials.

SUMMARY OF THE INVENTION

The above described needs are addressed by the preferred embodiments of the present invention in which partially or completely delignified and individualized cellulose fibers are pre-treated with selective inorganic or organic biocides, thereby producing an engineered cellulose fiber. When used in fiber cement composite materials, this engineered fiber retains the advantages of regular cellulose fibers of refining, autoclaving, and manufacture without pressing, but the resultant fiber cement material also can approach or even exceed the performance advantages of artificial fibers such as PVA, in terms of biological durability when used in fiber reinforced cement composite materials. The enhancement in the desirable biodurability is accomplished without any significant reduction in the important physical properties of the material, such as strength and toughness.

Thus, the preferred embodiments of the present invention disclose a new technology of making reinforced cementitious composite materials using biocide treated rot-resistant, individualized cellulose fibers. This new technology includes the following aspects: fiber treatment, formulations, methods of making the composite materials, and final materials and properties. The preferred embodiments of this invention solve the problem of poorer biodurability associated with cellulose fiber reinforced cementitious composite materials when compared with asbestos cement materials.

Thus, the use of these engineered rot-resistant fibers imparts to the composite material the enhanced biodurability properties, and therefore constitute an alternative technology that, when fully implemented, has the potential to maintain mechanical properties and the workability with the material in building and construction, while improve the durability of the products in the high humidity and rot-prone environments, regardless of the means of manufacture. They are particularly suitable to the Hatschek process that requires a refine-able fiber (to catch solid particles) and to the autoclave curing cycle that allows the replacement of cement with fine ground silica, although they may also be of use in the air cured products, in conjunction with PVA, to reduce the necessity of the expensive process pressing.

A composite building material made in accordance with one preferred embodiment of the present invention comprises a cementitious matrix and chemically treated and individualized cellulose fibers incorporated into the matrix to improve the biological durability of the final product. The inner and outer surfaces of the fiber cell walls are at least partially treated with chemicals (biocides) that inhibit microorganism growth. The chemicals may comprise inorganic compounds, organic compounds, or combinations thereof. The chemicals may include various kinds of fungicides, algaecides, and termite preservatives. Preferably, the chemicals comprise about 0.01% to 20% of the oven dry weight of the cellulose fibers.

Embodiments of the present invention will impart the fiber cement composite material with improved biodurability. Incorporation of the biocide treated fibers will increase the retention of the cellulose fiber when the fiber cement matrix is subjected to rot-prone high humidity environment. In one embodiment, the loss of fibers over 6 months of underground exposure was reduced from about 78% to about 32% when the biocide treated fibers are used. The high retention of fibers is indicative of better retention of reinforcement efficiency of the fibers in the fiber cement composite materials.

In another aspect of the present invention, a material formulation used to form a composite building material comprises a cementitious binder and cellulose fibers, wherein the cellulose fibers have been individualized and wherein at least a portion of the individualized fibers are pre-treated with at least one biocide such that the biocide inhibits microorganism growth in and on the fibers. A composite material formulation using the biocide treated fibers in accordance with one preferred embodiment comprises a cementitious binder, usually Portland cement; an aggregate, usually silica which may be fine ground if the autoclave process is used; individualized cellulose fibers wherein at least a portion of the individualized fibers are pre-treated with at least one biocide such that the biocide inhibits microorganism growth in and on the fibers; a density modifier; and additives. In one embodiment, the building material formulation preferably comprises about 10%–80% cementitious binder, more preferably about 15%–50%; about 20%–80% silica (aggregate), more preferably about 30%–70%; about 0.5%–20% biocide treated, rot-resistant, and individualized cellulose fibers, or a combination of rot-resistant individualized cellulose fibers, and/or regular cellulose fiber, and/or natural inorganic fibers, and/or synthetic fibers; about 0%–80% density modifiers; and about 0–10% additives.

In another aspect of the present invention, a method of manufacturing a fiber reinforced composite building material is provided. Individualized cellulose fibers are provided. At least a portion of the cellulose fibers is treated with a chemical, wherein the chemical inhibits microorganism growth in the treated cellulose fibers. The treated fibers are mixed with a cementitious binder to form a fiber cement mixture. The fiber cement mixture is formed into a fiber cement article of a pre-selected shape and size. The fiber cement article is cured so as to form the fiber reinforced composite building material.

Some of these steps can be omitted or rearranged, and other steps may be provided. The step of treating the fibers comprises treating the fibers with inorganic and organic biocides, or combinations thereof by means of techniques such as chemical reactions and/or physical deposition processes such as pressure or temperature impregnation and concentration diffusion. In this step, partially or completely delignified and individualized cellulose fibers are used for the fiber treatment. The effective biocides are attached to the fibers to provide enhanced biological resistances. The biocides that can be used for this purpose include a number of inorganic and organic chemicals and the combinations thereof.

Preferably, the step of mixing the treated fibers with ingredients to form a fiber cement mixture comprises mixing the treated fibers with a cementitious binder, aggregate, density modifiers, and additives. Preferably, the step of mixing the biocide treated fibers with ingredients to form a fiber cement mixture comprises mixing the biocide fibers with non-cellulose materials such as a cementitious binder, aggregate, density modifiers, and additives in accordance with the preferred formulations. In another embodiment, the biocide treated fibers can also be mixed with conventional untreated fibers and/or synthetic fibers, and/or natural inorganic fibers along with the other ingredients. The composite materials can be fabricated using any of the existing technologies, such as Hatcheck process, extrusion, and molding, etc.

Incorporation of the biocide treated fibers in the fiber cement matrix in accordance with the embodiments of the present invention improves rot resistance and durability of the final composite materials. The scope of the invention is not limited to particular types of cement, aggregates, density modifiers or additives, nor to their ratios in the formulations. These and other objects and advantages of the present invention will become more apparent from the following description taken in conjunction with the accompanying drawings.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE PREFERRED EMBODIMENTS

Figure 1:
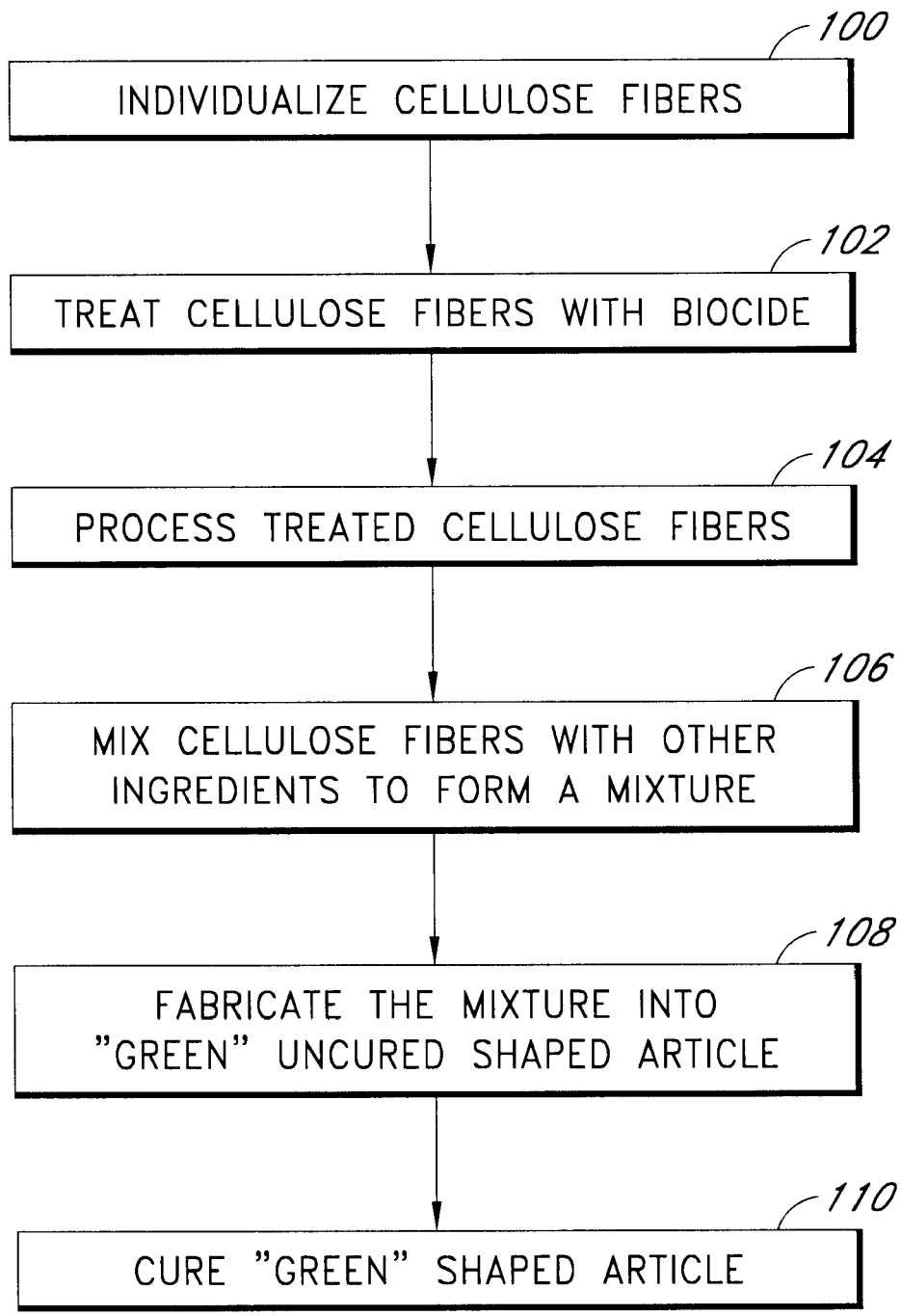
FIG. 1 illustrates a process flow for manufacturing a fiber reinforced cementitious composite material using biocide treated cellulose fibers in one embodiment of the present invention.

The preferred embodiments of the present invention describe the use of biocide treated cellulose fibers in cementitious fiber reinforced building materials. These embodiments encompass not only the building product formed with biocide treated fibers, but also the formulation and the methods of manufacture of the composite materials, as well as the methods for chemically treating the fibers to improve the durability of the fibers. Further details on related chemical treatments of fibers, particularly individualized cellulose fibers, in order to improve the resistance of the resulting building material to water and/or environmental degradation, are found in Applicant's copending applications entitled FIBER CEMENT COMPOSITE MATERIALS USING SIZED CELLULOSE FIBERS Serial No. 09/969,742; FIBER CEMENT COMPOSITE MATERIALS USING CELLULOSE FIBERS LOADED WITH INORGANIC AND/OR ORGANIC SUBSTANCES Serial No. 09/969,957; and METHOD AND APPARATUS FOR REDUCING IMPURITIES IN CELLULOSE FIBERS FOR MANUFACTURE OF FIBER REINFORCED CEMENT COMPOSITE MATERIAlS Serial No. 09/970,389, the entirety of each of these applications being hereby incorporated by reference. It will be appreciated that the aspects of the present invention are not applicable solely to cellulose fiber reinforced cementitious products, and accordingly, these techniques may be applied to building materials reinforced with other fibers in non-cement products as well.

In one preferred embodiment, this invention relates to the addition of biocide treated fibers into cementitious cellulose reinforced composite materials. The biocide treated fibers generally comprise cellulose fibers incorporated with chemicals that inhibit microorganism growth. The biocide chemicals are preferably placed in the locations on the fiber where biological activities are most likely to occur. For example, biocide chemicals are preferably applied to the inner and outer surfaces of the water conducting channels and pores of the fiber where microorganisms are most likely to grow and to cause damages to the fibers. The fibers can be treated with biocide chemicals using chemical reaction and/or physical forces to bond or attach the chemicals to the surface of the cell walls of the fibers. The fiber treatment method may include pressure impregnation or concentration diffusion or other techniques with the aid of gradients of pressure, temperature, concentration, pH or other ionic strengths. Preferably, the biocide treatment occurs at ambient temperatures, or less than about 100° C. Advantageously, the biocide chemicals incorporated into the fibers retard or inhibit the microorganism growth and thus improve the biological resistance of the fibers. Since the fiber is the reinforcing agent, the improvement in the biological resistance of the fibers in turn enhances the durability of the fiber cement composite material. The dosage of the biocides in treating fibers is preferably in the range of 0.01% to 20% of the oven dry mass of the fibers, depending on the types of biocides, treatment processes and the final product requirements.

Selection of biocides for the fiber treatment and how to use the biocide treated fibers in the manufacturing of fiber reinforced cement material will now be described. The biologically active biocides selected for the fiber treatment preferably have strong affinities to cellulose fibers, do not interfere with cement hydration reactions, and do not contaminate the process water. The effective biocides are preferably stable in the high temperature and alkaline conditions (pH>10). Moreover, the chemicals preferably provide some other beneficial attributes to the fiber cement composite materials. Many known biocides are not suitable for the fiber treatment due to these strict requirements. Biocide leaching out from the treated fibers and the products significantly limits the availability of the biocides applicable to the preferred embodiments. Surprisingly, several biocides meet the above requirements and provide good efficacy in combating the biological activities.

Chemicals that can be used as effective biocides for the fiber treatment include, but are not limited to, sodium, potassium, calcium, zinc, copper, and barium salts of carbonate, acetate, pulmitate, oleate, stearate, phosphate, silicate, sulfate, halide, and borate in all forms; zinc carboxylates; boric acids; sodium dichromate; copper chrome arsenate (CCA); chromated copper borate (CBC); ammoniacal copper arsenate (ACA); ammoniacal copper zinc arsenate (ACZA); copper chromium fluoride (CFK); copper chromium fluoroborate (CCFB); copper chromium phosphorous (CCP); and other inorganic compounds.

Furthermore, organic compounds can also be used for the fiber treatment, including but not limited to propiconazole in various formulations; tebuconazole with a variety of formulations; organochloride such as pentachlorophenol (PCP); quaternary ammonium compounds (AAC); copper 8-hydroxyquinoline or copper oxene in various formulations; tri-n-butyltin oxide (TBTO) of all kinds of formulations; tri-n-butyltin naphthenate (TBTN) in various formulations; didecyldimethylammonium bromide (DDAB) in various formulations; didecyldimethylammonium chloride (DDAC) of all kinds in various formulations; and other fungicides of all kinds; algaecides of all kinds; and termite preservatives of all kinds.

The fibers are preferably treated with one or more biocides listed above, depending on the particular attributes needed for a specific application of the fiber cement material. The fiber treatment preferably occurs in the presence of water or organic solvents, with the biocide treatment of the fiber, either through depositing, chemical reaction or other mechanism, preferably occurring upon contact of the chemical compounds with the cellulose fibers. It can be appreciated that the above lists of chemicals are merely illustrative examples of substances that can be used for fiber biocide treatment. The chemicals can also be any other suitable inorganic or organic compounds that have inhibitory effects to fungal, bacterial, algae, and mold growth.

The cellulose fibers used for the biocide treatment are preferably partially or completely delignified individual fibers. Therefore, the fibers can be bleached, unbleached, or semi-bleached cellulose pulps manufactured by various methods or processes. In a pulping process, wood or other lignocellulosic raw materials such as kenaf, straw, bamboo, and the like are reduced to a fibrous mass by the means of rupturing the bonds within the structures of lignocellulosic materials. This task can be accomplished chemically, mechanically, thermally, biologically, or by combinations of these treatments.

In some preferred embodiments, the cellulose fibers used for reinforcing cement composite materials are predominantly individualized fibers and are made by chemical pulping methods, which rely mainly on the effects of chemicals to separate fibers during pulping process. Based on the chemicals used in the process, the chemical pulping methods are classified as Soda, Kraft, Kraft-AQ, Soda-AQ, Oxygen Delignification, Kraft-Oxygen, Organic Solvent methods, and Sulfite method, and the like. In the chemical pulping, lignin, which acts as glue holding cellulose and hemicellulose together to provide mechanical strength in the wood, is broken and dissolved by chemical reactions. These chemical reactions are usually carried out in a reactor, often called digester, under a temperature of about 150° C. to 250° C. for about 30 minutes to 2 hours. The cleavage of the bonds between lignin and cellulosic components results in weakening of the bonds among fibers. With aids of mild mechanical forces, cellulose fibers are then separated into individual fibers. The regular cellulose fibers used for preparation of biocide treated fibers are individualized cellulose fibers with partial or complete removals of lignin components from the fiber cell walls. The treated cellulose fibers are made from cellulose pulps of a lignocellulosic material by a pulping process.

The cellulose pulps can be made of a variety of lignocellulosic materials including softwood, hardwood, agricultural raw materials, recycled waste paper or any other forms of lignocellulosic materials. Preferably, the fibers that are selected for biocide treatment are individualized fibers. Preferably, the fiber lengths are in the range of about 0.2 to 7 mm, more preferably, in the range of about 0.6 to 4 mm.

Preferred formulations of the composite material of the present invention comprise a cementitious hydraulic binder, aggregate, biocide treated cellulose fibers, density modifiers, and various additives to improve different material properties. The cementitious binder is preferably Portland cement but can also be, but is not limited to, high alumina cement, lime, ground granulated blast furnace slag cement, and high phosphate cement, or mixtures thereof. The aggregate is preferably ground silica sand but can also be, but is not limited to, to amorphous silica, micro silica, diatomaceous earth, coal combustion fly and bottom ashes, rice hull ash, blast furnace slag, granulated slag, steel slag, mineral oxides, mineral hydroxides, clays, magnasite or dolomite, metal oxides and hydroxides, polymeric beads, or mixtures thereof.

The biocide treated cellulose fibers are preferably individualized unrefined/unfibrillated or refined/fibrillated cellulose fibers. For Hatschek process, the treated fibers are preferably refined to a freeness range of 150 to 750 degree of Canadian Standard Freeness (CSF) in accordance with Tappi method T227-om-99, or more preferably in the range of 150 to 650 CSF. For other processes such as extrusion and molding, the treated fibers may be applied without refining.

Furthermore, the density modifiers preferably include organic and/or inorganic density modifiers with a density less than about 1.5 g/cm$^3$. The density modifiers may include plastic material, expanded polystyrene, glass and ceramic material, calcium silicate hydrates, microspheres and volcano ashes including perlite, pumice, shirasu, zeolites in expanded forms. The density modifiers can be natural or synthetic materials or mixtures thereof. The additives can include, but are not limited to, viscosity modifiers, fire retardants, waterproofing agents, silica fume, geothermal silica, pigments, colorants, plasticisers, dispersants, forming agents, flocculent, drainage aids, wet and dry strength aids, silicone materials, aluminum powder, clay, kaolin, bentonite, alumina trihydrate, zeolite, mica, metakaolin, calcium carbonate, wollastonite, polymeric resin emulsion, or mixtures thereof.

Biocide treated fibers can be used in a variety of composite materials, all having different proportions of cementitious binder, aggregate, density modifiers, treated and/or untreated cellulose fibers, and additives to obtain optimal properties for a particular application. The composite formulation according to one aspect of the present invention contains up to about 20% of biocide treated fibers, preferably from about 0.5% to 20%. Furthermore, the biocide treated fibers may be blended with regular untreated cellulose fibers and/or synthetic polymer fibers, and/or natural inorganic fibers in different proportions. It will be appreciated that the percentage of biocide treated fibers may be varied depending on the desired application and/or process. Furthermore, the proportion of the cementitious binder, aggregate, density modifiers, and additives can also be varied to obtain optimal properties for different applications, such as roofing, fencing, decking, paving, pipes, siding, trim, soffits, backer for tile underlayment.

One formulation for the preferred embodiments of this invention comprises:

about 10%–80% cement (cementitious binder);
 about 20%–80% silica (aggregates);
 about 0%–50% density modifiers;
 about 0–10% additives; and
 about 0.5%–20% biocide treated cellulose fibers, or a combination of biocide treated cellulose fibers, and/or regular cellulose fiber, and/or natural inorganic fibers, and/or synthetic fibers.

In autoclaved embodiments, a lower amount of cement can be used incorporating individualized, biocide treated cellulose fibers. In one embodiment, this autoclaved formulation comprises:

about 20–50% cement, more preferably about 25–45%, even more preferably about 35%;
 about 30%–70% fine ground silica, more preferably about 60%;
 about 0%–50% density modifiers;
 about 0%–10% additives, more preferably about 5%; and
 about 2%–20% fibers, more preferably about 10% fibers, of which some fraction is cellulose biocide treated, rot-resistant, and individualized cellulose fibers.

Preferably, the fibers have a freeness of 150 to 750 CSF measured in accordance with Tappi method T227-om-99. The cementitious binder and silica preferably have surface areas of about 250 to 400 m$^2$/kg and about 300 to 450 m$^2$/kg, respectively. The surface area for both the cement and silica is tested in accordance with ASTM C204-96a.

FIG. 1 illustrates a preferred process of manufacturing a fiber reinforced cementitious composite material incorporating biocide treated cellulose fibers. In step 100 the fibers are individualized, preferably by a chemical pulping process such as described above. It will be appreciated that in performing this preferred manufacturing process, however, the chemical pulping step may not be necessary. This is because individualizing of fibers is often done by the fiber manufacturer, who then provides the fibers to the buyer on standard lap sheets or rolls. Thus, in one embodiment, the individualization of such fibers merely includes mechanically separating the fibers from the sheets or rolls, such as by hammer milling or other methods, as described in step 104 below.

In step 102 partially or completely delignified and individualized cellulose fibers are treated with one or more biocides. In step 102, one or more biocides are placed adjacent the inner and outer surfaces of the water conducting channels and the pores of the fibers using well-known techniques such as chemical reactions, pressure impregnation, concentration diffusion, or dry spraying. The treatment can be carried out in a pulp slurry by mixing the pulp with effective biocides. Alternatively, dry pulps can be treated with biocides by spraying biocide-containing solutions onto the pulp web. In one embodiment, the biocide treated fibers are made into dry forms such as in laps and rolls, while in another embodiment the biocide treated fibers are made into wet forms such as in wet laps and in containers.

It will be appreciated that fibers may be available from a fiber manufacturer already individualized and treated with biocides. However, to ship the fibers, in one embodiment the fibers are then made into dry forms such as in laps and rolls, and thus, require individualization again once they arrive at the manufacturing facility. In another embodiment, the biocide-treated fibers are made into wet forms such as in wet laps and slurry in containers. In another embodiment, the fibers are dried by some special means (such as flash drying) and transported individualized in a silo or containers.

For embodiments where the fibers are made into laps or rolls, the treated fibers in step 104 are subsequently processed to again individualize the fibers. The biocide treated fibers are processed in step 104, in which the treated fibers are dispersed and/or fibrillated. Preferably, the fibers are dispersed at a consistency of about 1% to 6% in a hydrapulper, which also imparts some fibrillation. Further fibrillation may be achieved using a pulp refiner or a series of refiners. Once dispersed, the fibers are then fibrillated to a range of about 150 to 750 Canadian Standard Freeness (CSF). More preferably, the fibers are then refined to the range of about 150 to 650 CSF. Fiberization, dispersion and/or fibrillation can also be achieved by other techniques such as hammer milling, roller milling, ball milling, and deflakering. However, use of biocide treated fibers without fibrillation is also acceptable or preferred for some products and processes.

As FIG. 1 shows, in step 106, the biocide treated cellulose pulps are proportionally mixed with the other ingredients to form a waterborne mixture, slurry, or paste. In one embodiment, the biocide treated fibers are mixed with cement, silica, a density modifier and other additives in a well-known mixing process to form a slurry or paste mixture. In the mixer, regular cellulose fibers, and/or natural inorganic fibers, and/or synthetic fibers can be blended with the biocide treated fibers. In other embodiments, biocides in powder or solution forms are directly added to the fiber cement admixture.

It will be appreciated that the individualizing, treatment and processing steps described above need not occur in the order described above. For example, biocide treatment of the fibers could take place before individualizing of the fibers. Furthermore, the processing step 104 may not be necessary if the fibers come directly from the fiber manufacturer individualized, or if individualization occurs at the fiber cement manufacturing facility. In these embodiments, after fiber treatment, the treated fibers can be added directly into the mix, as described below.

The process follows with step 108 in which the mixture may be formed into a "green" or uncured shaped article using a number of conventional manufacturing as would be known to one of skillful in the art, such as the:

Hatschek sheet process;
Mazza pipe process;
Magnani process;
Injection molding;
Extrusion;
Hand lay-up;
Molding;
Casting;
Filter pressing;
Fourdrinier forming;
Multi-wire forming;
Gap blade forming;
Gap roll/blade forming;
Bel-Roll forming; and
Others.

These processes may also include a pressing or embossing operation after the article is formed. However, more preferable, no pressing is used. The processing steps and parameters used to achieve the final product using a Hatschek process are similar to what is described in Australian Patent No. 515151.

Following step 108, the "green" or uncured shaped article is cured in step 110. The article is preferably pre-cured for up to 80 hours, most preferably 24 hours or less. The article is then air-cured for approximately 30 days. More preferably, the pre-cured articles is autoclaved at an elevated temperature and pressure in a steam saturated environment at 60° C. to 200° C. for 3 to 30 hours, more preferably 24 hours or less. The time and temperature chosen for the pre-cure and cure processes are dependent on the formulation, the manufacturing process, the process parameters, and the final form of the product.

Advantageously, fiber cement composite materials incorporating biocide treated cellulose fibers improve rot resistance in both fiber cement and fiber—fiber matrices. The improved rot resistance of fibers in the fiber cement matrix significantly enhances the biodurability of the fiber cement composite materials, resulting in better retention of fiber reinforcement efficiency. As illustrated in the following examples, the composite material with biocide treated fibers experienced significantly less fiber loss over time when compared to the materials made with regular untreated cellulose fibers for the same formulation.

Material Properties and Test Results

Applications of biocide treated cellulose fibers in fiber reinforced composite materials improve the biodurability of the material. Fiber cement products using biocide treated cellulose fibers experience significantly less fiber loss over time when compared with materials made with conventional cellulose fibers. The use of biocide treated cellulose fibers also does not compromise the physical and mechanical properties of the product.

TABLE 1

| Formula Identification | Cementitious Binder Portland Cement | Aggregate Silica | Fibers | | |
|---|---|---|---|---|---|
| | | | Regular Untreated Cellulose Fiber | 0.12% Propiconazole Treated Fiber | 0.5% Copper Oxene Treated Fiber |
| A | 35% | 57% | 8% | 0% | 0% |
| B | 35% | 57% | 0% | 8% | 0% |
| C | 35% | 57% | 8% | 0% | 0% |
| D | 35% | 57% | 0% | 0% | 8% |

Table 1 above lists illustrative fiber cement formulations having biocide treated fibers (Formulations B and D), compared to a control having an equivalent formulation but without biocide fibers (Formulations A and C). An equivalent formulation is herein defined as one in which the preferred treated cellulose fibers are displaced by an equivalent percentage of untreated cellulose fibers. The fibers in Formulations A, B, C and D are unbleached Kraft pulps. They all have freeness of 450 to 475 CSF measured in accordance with TAPPI method T227-om-99. The fiber lengths for all fibers in Formulation A to D are from 2.45 to 2.50 mm.

TABLE 2

Comparison of Fiber Loss in Fiber Cement Composite Materials With and Without Biocide Treated Cellulose Fibers After 9 Months of Half-Buried Exposure Test

| Density of Fiber Cement Composites (Kg/m$^3$) | 1200 | | 900 | |
|---|---|---|---|---|
| Formulation | A | B | C | D |
| Fiber Type in Fiber Cement Composites | Regular Cellulose Fibers | Biocide Treated Fibers | Regular Cellulose Fibers | Biocide Treated Fibers |
| Fiber Loss in Below Ground Portion (%) | 12 | 8 | 79 | 32 |

Table 2 above provides an illustrative comparison of fiber loss in fiber cement composite materials with formulations that incorporate biocide treated cellulose fibers and equivalent formulations that use conventional, untreated cellulose fibers in accordance with Table 1 after 9 months of half-buried exposure test. The half-buried test was conducted in accordance with AWPA (American Wood Preservers' Association) Standard E7-93, "Standard Method of Evaluating Wood Preservatives by Field Tests with Stakes." An equivalent formulation is herein defined as one in which the preferred treated cellulose fibers are displaced by an equivalent percentage of untreated cellulose fibers. Prototype specimens of fiber cement materials are produced based on the same formulation with four different pulps (A, B, C, D). Each specimen was half-buried for nine months in a high humidity and rot prone environment where aspen wood specimens would typically experience total decay within 3 to 6 months. After the exposure, the specimens were analyzed for cellulose contents.

For the fiber cement composite specimen with a density of 1200 $Kg/m^3$, use of 0.12% propiconazole treated fiber in place of regular untreated fiber reduces fiber loss from about 12% to 8%, after a 9 months exposure to a high humidity environment in the half-buried field test. For the specimen with a density of 900 $Kg/m^3$, use of 0.5% copper oxene treated fiber can reduce the fiber loss from about 79% to 32% for the buried portion of the specimen. Therefore, use of the biocide treated cellulose pulps will reduce cellulose loss in the fiber cement matrix in rot prone wet environments and improve the durability and performance of the fiber cement composite materials made.

Incorporation of the biocide treated cellulose pulps in fiber cement composites will improve the durability and rot resistance of the fiber cement matrix, which are evidenced by the high retention of the treated fiber content in the fiber cement products. Durable fibers in the fiber-reinforced cement composite material will provide sustainable high physical and mechanical strengths as illustrated in Table 3. The mechanical test was performed under the wet condition in accordance with ASTM (American Standard Test Method) C1185-98a entitled "Standard Test Methods for Sampling and Testing Non-Asbestos Fiber-Cement Flat Sheet, Roofing and Siding Shingles, and Clapboards."

in the art that the specific values of particular mechanical properties will differ by varying the oven dry density. As shown in Table 3, Formulation E contains regular cellulose fiber and Formulation F is an equivalent formulation that contains fibers that are treated with 2% barium borate by fiber mass. Specifically, Formulation E contains 8% untreated cellulose fibers and Formulation F contains 8% treated fibers. The cement and silica contents are the same for both formulations: 35% and 57% respectively. The freeness of the regular and barium borate treated cellulose pulps have a freeness level of about 470+/−10 CSF. The fiber lengths for these two fibers are about 2.5 mm.

It will be appreciated that the fiber cement formulations are selected for comparison purposes only and that a variety of other formulations can be used without departing from the scope of the invention. It will also be appreciated that in addition to fiber cement products, other cementitious and non-cementitious materials may also use biocide treated fibers to improve the rot-resistance of the material.

As shown in Table 3, after 18 months of half buried exposure test, retention of key mechanical properties such as modulus of rupture (MOR), ultimate strain, toughness, and modulus of elasticity (MOE) is generally higher for Formulation F with biocide treated cellulose fibers when compared to the equivalent formulation, E, the control formulation, without treated fibers. In one embodiment, the treated cellulose fibers increase the retention of modulus of rupture (MOR) of the building product after 18 month by more than about 10%, the retention of ultimate strain by more than about 5%, the retention of toughness by more than about 10%, the retention of modulus of elasticity (MOE) by more than about 10%.

Figure 2:
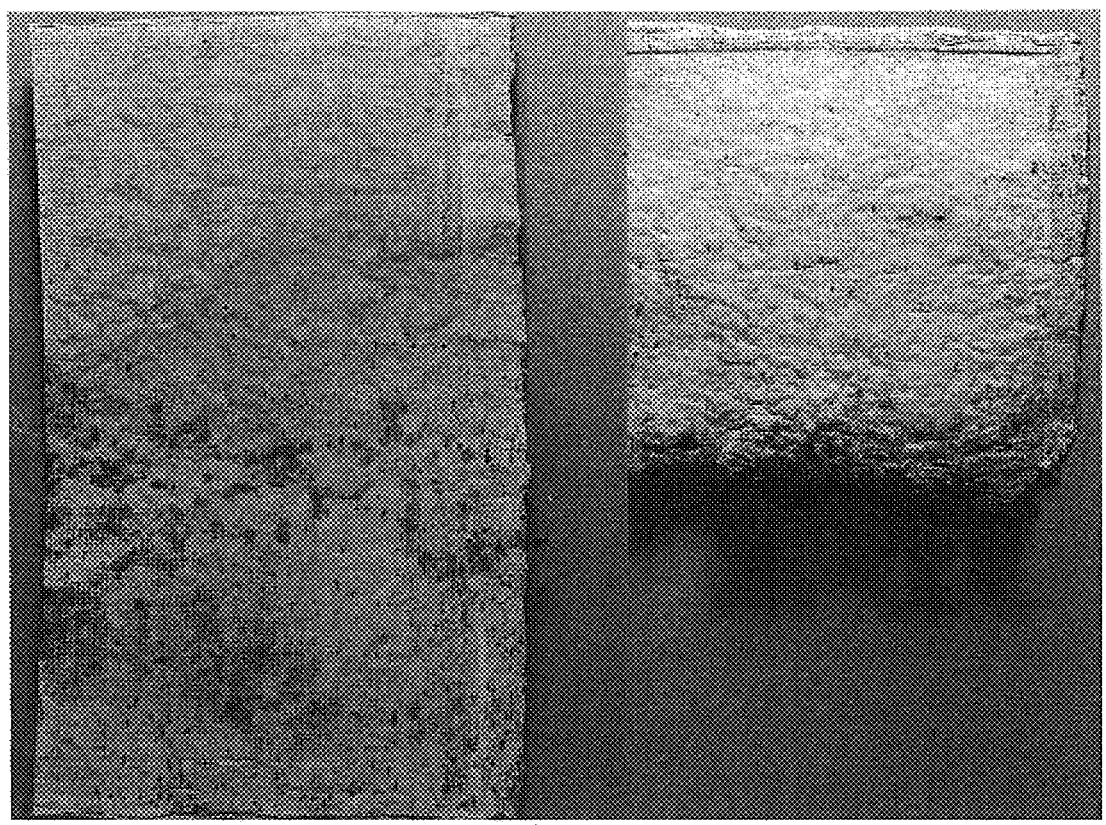
FIG. 2 is a photograph illustrating specimens made with regular cellulose fibers and biocide treated cellulose fibers after three months of exposure in a rot prone environment.

FIG. 2 displays a photograph picture of fiber specimens (untreated and treated with 0.1% copper sulfate) after a three months half-buried test in a high humidity and rot prone environment. As FIG. 2 shows, biocide (0.1% copper sulfate) treated fiber specimen remains substantially intact while conventional, untreated fiber specimen experiences

TABLE 3

Retention of Mechanical Properties of Fiber Cement Composite Materials with and without Biocide Treated Fibers after 18 Months Half-Buried Exposure Test

| Formulation Fiber Type | E Regular Cellulose Fibers | | | | F 2% Barium Borate Treated Cellulose Fiber | | | |
|---|---|---|---|---|---|---|---|---|
| Mechanical Properties | MOR (MPa) | Ultimate Strain (μm/m) | Toughness (KJ/m³) | MOE (GPa) | MOR (MPa) | Ultimate Strain (μm/m) | Toughness (KJ/m³) | MOE (GPa) |
| Initial | 9.44 | 4949 | 3.46 | 5.54 | 9.32 | 5421 | 3.91 | 5.57 |
| After 18 Months of Exposure | 7.43 | 2218 | 0.56 | 4.60 | 8.31 | 2770 | 1.06 | 5.14 |
| Retention of Mechanical Properties (%) | 78.7 | 44.8 | 16.2 | 83.0 | 89.2 | 51.1 | 27.1 | 92.3 |

Table 3 illustrates retentions of physical and mechanical properties of fiber cement composite materials made with and without biocide treated cellulose fibers after 18 months of half-buried exposure test. Again, the half-buried test was conducted in accordance with AWPA (American Wood Preservers' Association) Standard E7-93, "Standard Method of Evaluating Wood Preservatives by Field Tests with Stakes." The oven dry density of samples from Formulation E and F is 1200 $Kg/m^3$. It will be appreciated to one of skill total decay in the portion that is buried under ground. Advantageously, the biocide treated cellulose fibers substantially improves the rot resistance and durability of fiber cement products even in humid and rot prone environments.

Although these engineered rot-resistant fibers have not been tried in every form of manufacture for fiber cement composite materials, it seems that they are imparting to the composite material the enhanced biodurability properties, and therefore constitute an alternative technology that, when fully implemented, has the potential to maintain mechanical properties and the workability with the material in building and construction, while improve the durability of the products in the high humidity and rot-prone environments, regardless of the means of manufacture. They are particularly suitable to the Hatschek process that requires a refineable fiber (to catch solid particles) and to the autoclave curing cycle that allows the replacement of cement with fine ground silica, although they may also be of use in the air cured products, in conjunction with PVA, to reduce the necessity of the expensive process pressing.

The foregoing description of the preferred embodiment of the present invention has shown, described and pointed out the fundamental novel features of the invention. It will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by appended claims.

What is claimed is:

1. A composite building material, comprising:
   a cementitious matrix;
   individualized cellulose fibers incorporated into the cementitious matrix, wherein the cellulose fibers are at least partially treated with a biocide chemical that inhibits microorganism growth inside the fibers; and
   untreated cellulose fibers.

2. The composite building material of claim 1, wherein the biocide chemical is attached to inner and outer surfaces of the individualized fibers.

3. The composite building material of claim 1, wherein the chemical is selected from the group consisting of fungicides, algaecides, mold and termite preservatives, and mixtures thereof.

4. The composite building material of claim 1, wherein the chemical comprises inorganic compounds.

5. The composite building material of claim 4, wherein the inorganic compounds are selected from the group consisting of sodium, potassium, calcium, zinc, copper, and barium salts of carbonate, acetate, stearate, silicate, sulfate, halide, and borate; zinc carboxylates; boric acids; sodium dichromate; copper oxene; copper chrome arsenate (CCA); chromated copper borate (CBC); ammoniacal copper arsenate (ACA); ammoniacal copper zinc arsenate (ACZA); copper chromium fluoride (CFK); copper chromium fluoroborate (CCFB); and copper chromium phosphorous (CCP), and combinations thereof.

6. The composite building material of claim 1, wherein the chemical comprises organic compounds.

7. The composite building material of claim 6, wherein the organic compounds are selected from the group consisting of propiconazole, tebuconazole, organochloride, quaternary ammonium compounds (AAC), tri-n-butyltin oxide (TBTO), tri-n-butyltin naphthenate (TBTN), didecyldimethylammonium bromide (DDAB), didecyldimethylammonium chloride (DDAC), and mixtures thereof.

8. The composite building material of claim 1, wherein the chemical comprises about 0.01% to 20% of the dry weight of the treated cellulose fibers.

9. The composite building material of claim 1, wherein the cellulose fibers are made from cellulose pulps of a lignocellulosic material by a pulping process.

10. The composite building material of claim 9, wherein the fiber lengths are between about 0.2 and 7 mm.

11. The composite building material of claim 10, wherein the fiber lengths are between about 0.6 and 4 mm.

12. The composite building material of claim 1, wherein the treated fibers comprise about 0.5%–20% by weight of the matrix.

13. The composite building material of claim 1, wherein the cementitious matrix and the individualized cellulose fibers are autoclaved.

14. The composite building material of claim 13, further comprising an aggregate.

15. The composite building material of claim 14, wherein the aggregate is ground silica.

16. The composite building material of claim 1, comprising about 10–80% cement by weight.

17. A composite building material, comprising:
   a cementitious matrix;
   individualized cellulose fibers incorporated into the cementitious matrix, wherein the cellulose fibers are at least partially treated with a biocide chemical and inhibits microorganism growth inside the fibers; and
   natural inorganic and synthetic fibers.

18. A material formulation used to form a composite building material, comprising:
   a cementitious binder; and
   cellulose fibers, wherein the cellulose fibers have been individualized and wherein at least some of the cellulose fibers are treated with a chemical to inhibit microorganism growth in the fibers, wherein the chemical comprises barium borate.

19. The formulation of claim 18, comprising about 10%–80% cement by weight.

20. The formulation of claim 18, wherein the cementitious binder has a surface area of about 250 to 400 m²/kg.

21. The formulation of claim 18, wherein the cementitious binder comprises Portland cement.

22. The formulation of claim 18, wherein the cementitious binder is selected from the group consisting of high alumina cement, lime, ground granulated blast furnace slag cement, and high phosphate cement.

23. The formulation of claim 18, further comprising an aggregate.

24. The formulation of claim 23, wherein the aggregate is approximately 30%–70% of the formulation by weight.

25. The formulation of claim 23, wherein the aggregate comprises silica having a surface area of about 300–450 m²/kg.

26. The formulation of claim 23, wherein the aggregate comprises ground silica.

27. The formulation of claim 23, wherein the aggregate is selected from the group consisting of amorphous silica, micro silica, geothermal silica, diatomaceous earth, coal combustion fly and bottom ashes, rice hull ash, blast furnace slag, granulated slag, steel slag, mineral oxides, mineral hydroxides, clays, magnasite or dolomite, metal oxides and hydroxides, polymeric beads, and mixtures thereof.

28. The formulation of claim 18, wherein the treated cellulose fibers comprise about 0.5%–20% of the formulation by weight.

29. The formulation of claim 18, further comprising a density modifier.

30. The formulation of claim 29, wherein the density modifier is about 0%–50% of the formulation.

31. The formulation of claim 29, wherein the density modifier comprises natural or synthetic lightweight materials selected from the group consisting of plastic material, expanded polystyrene, other foamed polymer materials, glass and ceramic material, calcium silicate hydrates, microspheres, volcano ashes including perlite, pumice, shirasu basalt, and zeolites in expanded forms, and mixtures thereof.

32. The formulation of claim 18, further comprising additives.

33. The formulation of claim 32 wherein the additives are about 0%–10% of the formulation.

34. The formulation of claim 32, wherein the additives are selected from the group consisting of viscosity modifiers, fire retardants, waterproofing agents, silica fume, geothermal silica, pigments, colorants, plasticisers, dispersants, forming agents, flocculent, drainage aids, wet and dry strength aids, silicone materials, aluminum powder, clay, kaolin, bentonite, alumina trihydrate, zeolite, mica, metakaolin, calcium carbonate, wollastonite, polymeric resin emulsion, and mixtures thereof.

35. At The formulation of claim 18, wherein the treated cellulose fibers decrease the average fiber loss in the composite building material by more than about 5% as compared to a building material made from an equivalent formulation without treated cellulose fibers after 9 months of exposure in a high humidity and rot prone environment.

36. The formulation of claim 18, wherein the treated cellulose fibers improve the rot resistance of the composite building material as compared to a building material made from an equivalent formulation without treated cellulose fibers.

37. The formulation of claim 0.19°, Wherein the treated cellulose fibers improve the retention of modulus of rupture (MOR) of the composite building material after 18 months of exposure in high humidity and rot-prone environment by more than about 5% as compared to a building material made from an equivalent formulation without treated cellulose fibers.

38. The formulation of claim 18, wherein the treated cellulose fibers improve the retention of modulus of elasticity (MOE) of the composite building material by more than about 5% after 18 months of exposure in high humidity and rot-prone environment as compared to a building material made from an equivalent formulation without treated cellulose fibers.

39. The formulation of claim 18, wherein the treated cellulose fibers improve the retention of ultimate strain of the composite building material by more than about 5% after 18 months of exposure in high humidity and rot-prone environment as compared to a building material made from an equivalent formulation without treated cellulose fibers.

40. The formulation of claim 18, wherein the treated cellulose fibers improve the retention of toughness of the building product by more than about 5% after 18 months of exposure in high humidity and rot-prone environment as compared to a building material made from an equivalent formulation without treated cellulose fibers.

41. A material formulation used to form a composite building material, comprising:
   a cementitious binder; and
   cellulose fibers, wherein the cellulose fibers have been individualized and wherein at least some of the cellulose fibers are treated with a chemical to inhibit microorganism growth in the fibers, wherein the chemical comprises copper oxene.

42. A material formulation used to form a composite building material, comprising:
   a cementitious binder; and
   cellulose fibers, wherein the cellulose fibers have been individualized and wherein at least some of the cellulose fibers are treated with a chemical to inhibit microorganism growth in the fibers, wherein the treated cellulose fibers are blended with untreated cellulose fibers.

43. A method of manufacturing a fiber reinforced composite building material, comprising:
   providing individualized cellulose fibers;
   treating at least a portion of the cellulose fibers with a chemical, wherein the chemical inhibits microorganism growth in the treated cellulose fibers;
   mixing the treated fibers with untreated cellulose fibers;
   mixing the treated fibers and the untreated cellulose fibers with a cementitious binder to form a fiber cement mixture;
   forming the fiber cement mixture into a fiber cement article of a pre-selected shape and size; and
   curing the fiber cement article so as to form the fiber reinforced composite building material.

44. The method of claim 43, wherein providing individualized fibers comprises removing a majority of the lignin binding the cellulose fibers together.

45. The method of claim 43, wherein providing individualized fibers comprises mechanically separating the fibers.

46. The method of claim 43, wherein cellulose fibers are individualized by a chemical pulping method.

47. The method of claim 43, wherein treating the fibers comprises physically and/or chemically bonding the biocide chemical to the outer and inner surface of the cellulose fibers.

48. The method of claim 43, wherein treating the fibers comprises using a pressure impregnation technique.

49. The method of claim 43, wherein treating the fibers comprises using a concentration diffusion technique.

50. The method of claim 43, further comprising processing the treated fibers by dispersing the fibers at a pre-selected consistency range and then fibrillating the treated fibers to a pre-selected freeness range.

51. The method of claim 43, wherein treating the fibers comprises chemically bonding a biocide to inner and outer surfaces of the cellulose fibers.

52. The method of claim 43, wherein processing the treated fibers comprises dispersing the treated fibers at the consistency of about 1%–6% in a hydra-pulper.

53. The method of claim 43, further comprising processing the treated fibers by fibrillating the treated fibers to the freeness of 150 to 750 degrees of Canadian Standard Freeness.

54. The method of claim 53, wherein processing the treated fibers comprises fibrillating the treated fibers to the freeness of 150 to 650 degrees of Canadian Standard Freeness.

55. The method of claim 43, wherein mixing the treated fibers with ingredients comprises mixing the treated fibers with an aggregate.

56. The method of claim 43, wherein mixing the treated fibers with ingredients comprises mixing the treated fibers with additives.

57. The method of claim 43, wherein mixing the treated fibers with ingredients comprises mixing the treated fibers with a density modifier.

58. The method of claim 43, wherein mixing comprises directly adding biocides to the mixture.

59. The method of claim 43, wherein forming the fiber cement article comprises forming the article using a process selected from the group consisting of a Hatschek sheet process, a Mazza pipe process, a Magnani process, injection molding, extrusion, hand lay-up, molding, casting, filter pressing, Fourdrinier forming, multi-wire forming, gap blade forming, gap roll/blade forming, Bel-Roll forming, and combinations thereof.

60. The method of claim 43, wherein curing the fiber cement article comprises pre-curing and curing.

61. The method of claim 60, wherein the fiber cement article is pre-cured for up to 80 hours at ambient temperature.

62. The method of claim 60, wherein the fiber cement article is pre-cured for up to 24 hours at ambient temperature.

63. The method of claim 60, wherein the fiber cement article is cured in an autoclave.

64. The method of claim 63, wherein the fiber cement article is autoclaved at an elevated temperature and pressure at about 60 to 200° C. for about 3 to 30 hours.

65. The method of claim 63, wherein the fiber cement article is autoclaved at an elevated temperature and pressure at about 60 to 200° C. for about 24 hours or less.

66. The method of claim wherein curing the fiber cement article comprises air curing the formed article for up to 30 days.

67. A The method of claim 17, further A method of manufacturing a fiber reinforced composite building material, comprising:

providing individualized cellulose fibers;

treating at least a portion of the cellulose fibers with a chemical, wherein the chemical inhibits microorganism growth in the treated cellulose fibers;

mixing the treated fibers with synthetic fibers;

mixing the treated fibers and synthetic fibers with a cementitious binder to form a fiber cement mixture;

forming the fiber cement mixture into a fiber cement article of a pre-selected shape and size; and curing the fiber cement article so as to form the fiber reinforced composite building material.

* * * * *